G. S. TIFFANY.
TELAUTOGRAPHIC APPARATUS.
APPLICATION FILED FEB. 24, 1912. RENEWED DEC. 1, 1917.

1,272,874.

Patented July 16, 1918.
6 SHEETS—SHEET 1.

G. S. TIFFANY.
TELAUTOGRAPHIC APPARATUS.
APPLICATION FILED FEB. 24, 1912. RENEWED DEC. 1, 1917.

1,272,874.

Patented July 16, 1918.
6 SHEETS—SHEET 3.

G. S. TIFFANY.
TELAUTOGRAPHIC APPARATUS.
APPLICATION FILED FEB. 24, 1912. RENEWED DEC. 1, 1917.

1,272,874.

Patented July 16, 1918.
6 SHEETS—SHEET 4.

UNITED STATES PATENT OFFICE.

GEORGE STEELE TIFFANY, OF SUMMIT, NEW JERSEY, ASSIGNOR TO GRAY NATIONAL TELAUTOGRAPH COMPANY, OF NEW YORK, N. Y., A CORPORATION OF VIRGINIA.

TELAUTOGRAPHIC APPARATUS.

1,272,874.   Specification of Letters Patent.   Patented July 16, 1918.

Application filed February 24, 1912, Serial No. 679,598. Renewed December 1, 1917. Serial No. 205,003.

*To all whom it may concern:*

Be it known that I, GEORGE S. TIFFANY, a citizen of the United States, residing at Summit, county of Union, and State of New Jersey, have invented certain new and useful Improvements in Telautographic Apparatus, fully described and represented in the following specification and the accompanying drawings, forming a part of the same.

This invention relates to improvements in telautographs, and particularly telautographs of the variable current strength type such as shown and described, for example, in Letters Patent of the United States No. 954,150, granted to me April 5, 1910; the invention having reference to various features of the telautographic system there shown, which will be hereinafter specifically referred to and pointed out in the claims.

In the accompanying drawings—

Figs. 11 and 12 are details of the master switch just referred to.

Each station comprises a transmitter instrument, hereinafter called a "transmitter", and a receiving instrument, hereinafter called a "receiver", indicated at the left and right, respectively, of each of the two diagrammatic Figs. 1 and 2. In the number, relative arrangement and construction and operation of parts, one station is the counterpart of the other. Therefore, in the following description, references will be made to either station, according as convenience in tracing circuits may dictate. As the parts in two stations are identical, corresponding reference numerals will be used in both, followed, however, in Fig. 2, for convenience of description, by the reference letter "a".

Each transmitter comprises a pair of rheostats 1, 2, included in a normally open local circuit, from a source of electric energy, for example a motor generator 3, the negative pole of which is grounded at 4, this local current-supplying circuit being controlled by a master switch, designated 5 as a whole, which will be hereinafter fully described. This local circuit, when closed (Fig. 1), that is to say, when the station is transmitting, consists of wire 6 from the positive brush of the generator, a stationary contact 7, a movable contact 8, wire 9, wire 10, wires 11, to right rheostat 1, wires 12, 13, 14, to left rheostat 2, and wires 15, 16 from right rheostat 1, and wires 17, 18, 16 from left rheostat 2, to the negative pole of generator 3. In the normal or receiving position of a station, its generator 3 serves simply as a source of energy for local circuits, hereinafter described, in its own receiver, while in the transmitting position of a station, its generator serves as a source of energy for the main line tracing circuits to the distant receiver and its own receiver and also as a source of energy for local circuits in the latter. Coacting with rheostats 1, 2, respectively, are two roller contacts 19, 20, carried by arms 21, 22, respectively, through which currents are shunted from generator 3 into right and left tracer main lines, respectively, leading, as usual, to the right and left sides of the distant receiver, and also into right and left local tracer lines leading to the right and left sides of the local receiver. It will be obvious that when the local circuit just referred to from generator 3 is closed, the currents shunted therefrom into the right and left main lines and local lines leading to the distant receiver and to the local receiver, respectively, will vary in strength in accordance with the positions, from time to time, of the roller contacts 19, 20, lengthwise of the rheostats 1, 2, respectively, these contacts being so moved along the rheostats 1, 2, by, and in accordance with the lateral or tracing movements of, the transmitting tracer 23. This tracer 23 is, as usual, and as best shown in Figs. 3, 4, 5, 6, mounted in the converging ends of a pair of rods 24, 25, the opposite ends of which are pivotally connected with the outer ends of arms 26, 27, the inner ends of which are in turn pivotally mounted to swing horizontally on posts 28 secured to a slab 29 of slate or other suitable insulating material mounted on the base 30 of the transmitter casing 31, on which slab are also mounted all the other internal and some of the external mechanisms of the transmitter. Each of the arms 26, 27, is adjustably connected with its arm 21 or 22, carrying the roller contact 19 or 20, by a pin and slotted bracket 32, which, however, is suitably insulated from the arm 26 or 27. So far as these parts of the apparatus are concerned, they are substantially the same as those shown and described in my said Patent No. 954,150; and therefore description thereof is unnecessary. Of course, it will be understood that the currents of varying strength shunted into the main line tracer circuits to the distant receiver, and into the local tracer circuits to the local receiver, will, as in my said patent, produce, through devices at the respective receivers which will presently be described, lateral movements of the receiving pens 33[a] and 33, respectively, corresponding in extent and direction to the lateral movements of the tracer 23 so that they will reproduce on the usual paper record strip 34[a], 34, respectively, the writing produced at the transmitter by the tracer 23 upon the paper record strip 35.

Figure 1:
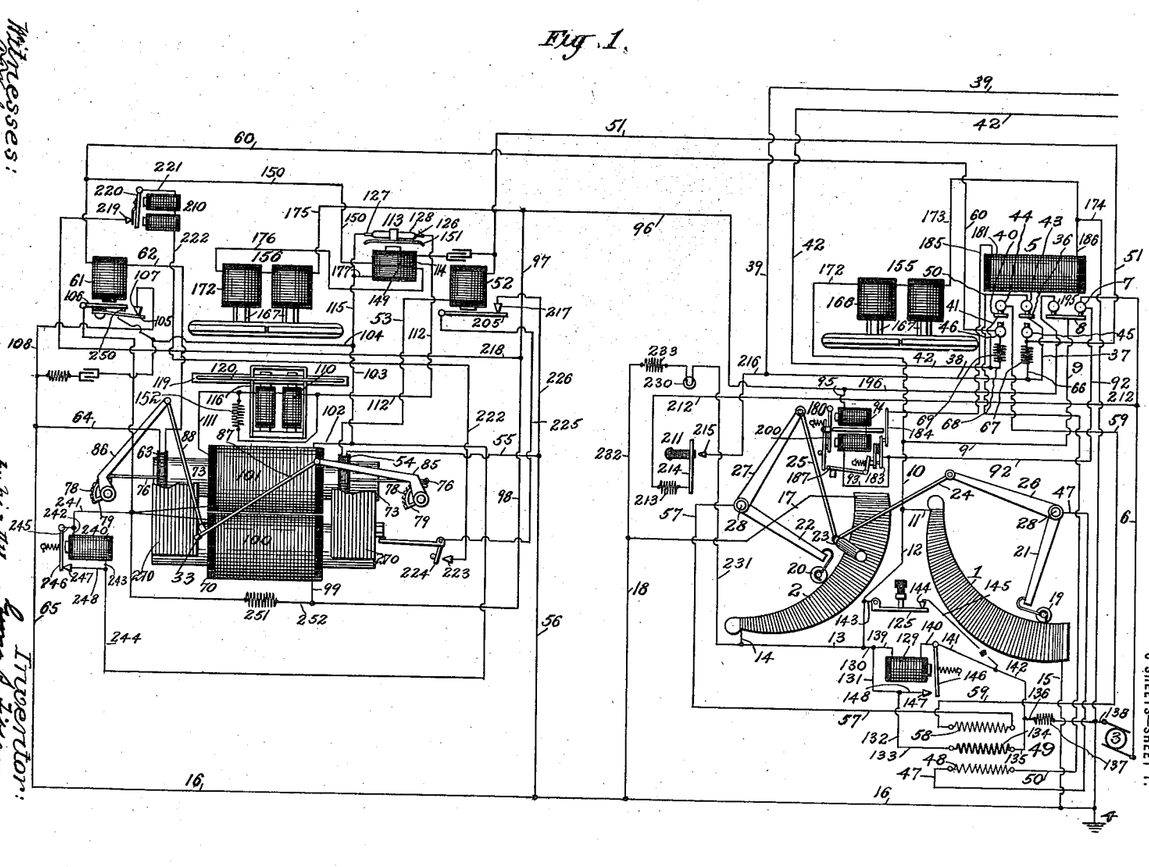
Figure 1 is a diagrammatic view of a station, shown, for convenience, in transmitting condition.
Figure 2:
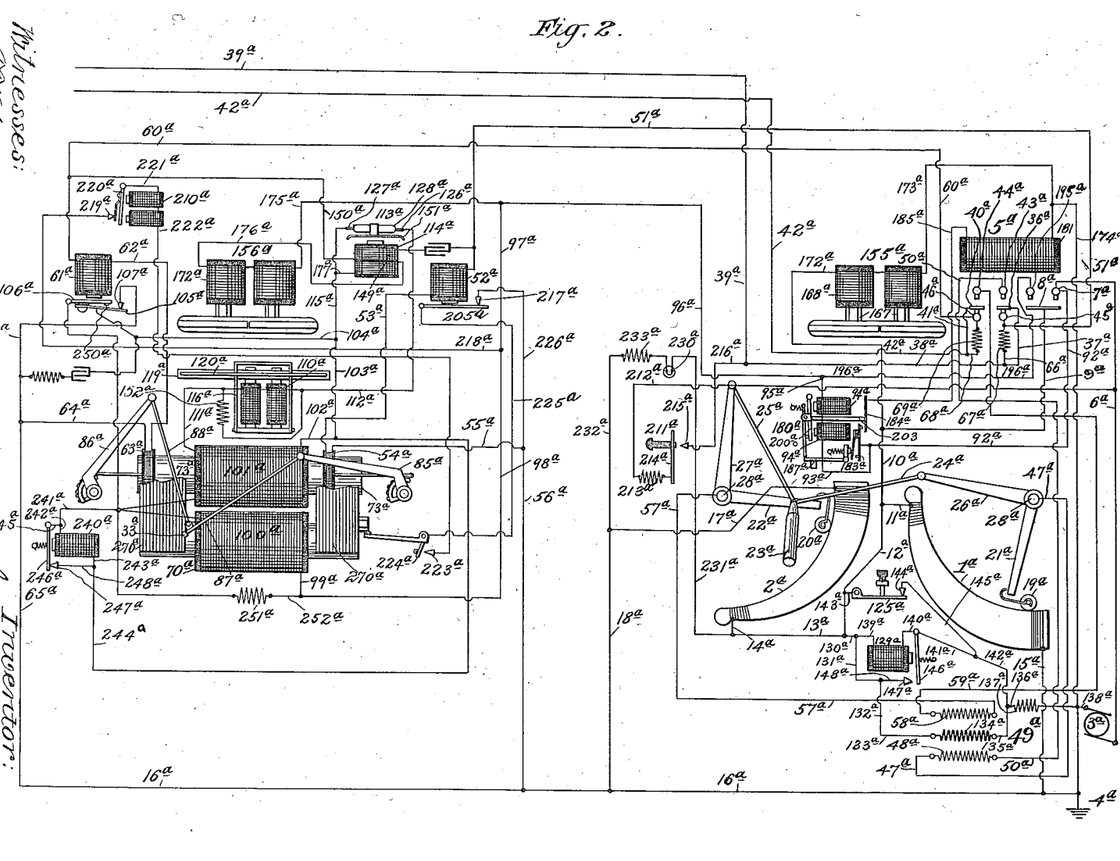
Fig. 2 is a like view of another station, shown, for convenience, as receiving from the station illustrated in Fig. 1.
Figure 3:
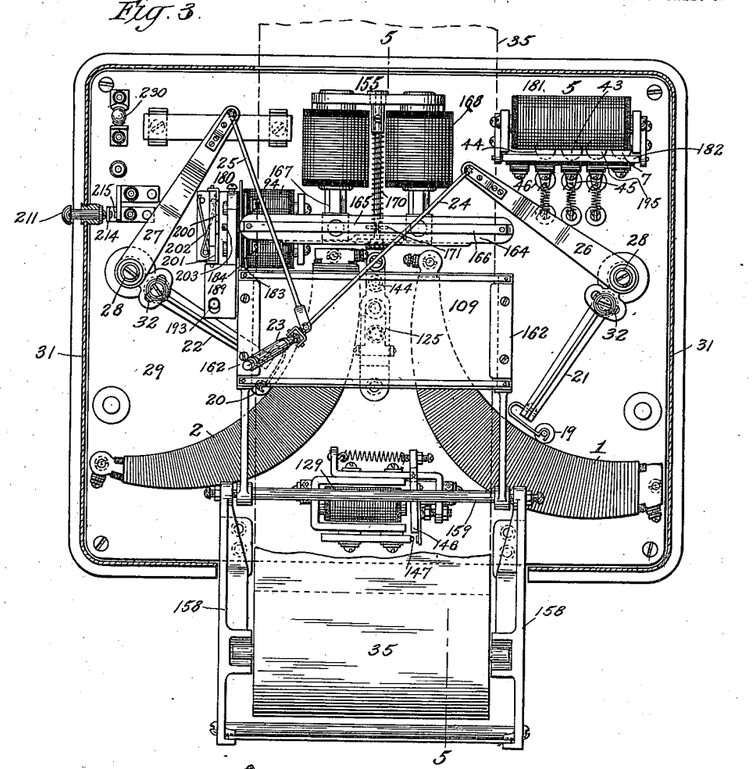
Fig. 3 is a plan view of the transmitting instrument with the casing thereof in section.
Figure 4:
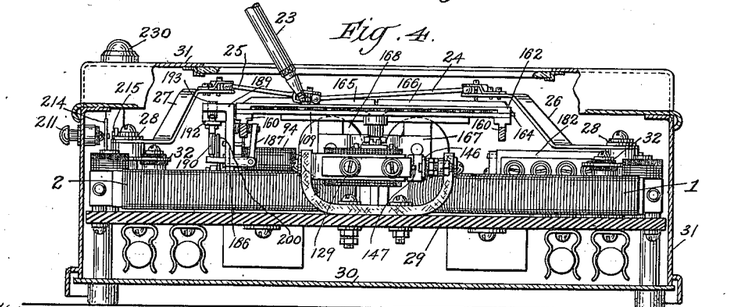
Fig. 4 is a front elevation of the same, partly in section.
Figure 5:
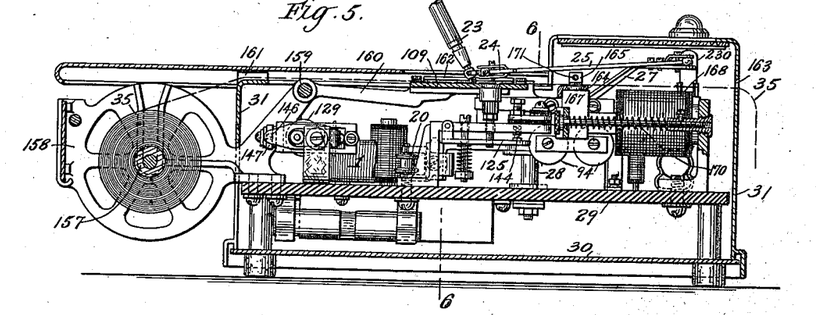
Fig. 5 is a longitudinal vertical section of the same on the line 5 of Fig. 3.
Figures 6, 7, 8, 10:
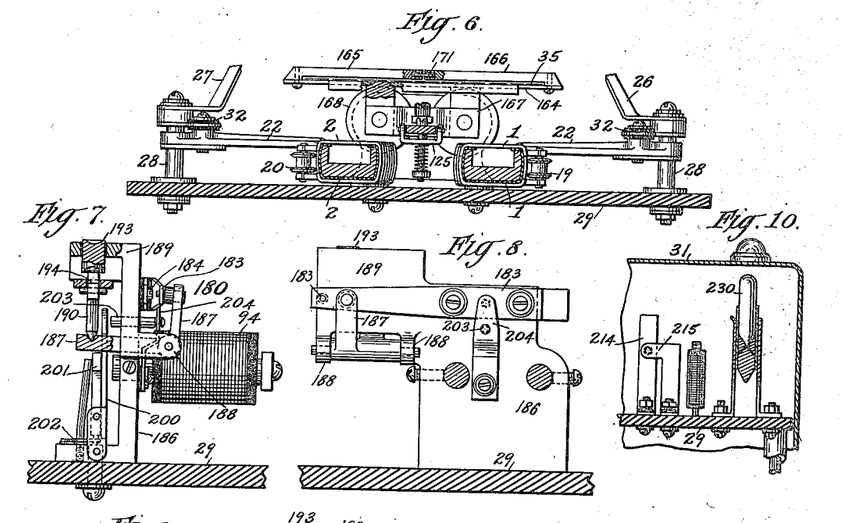
Fig. 6 is a vertical section on the line 6 of Fig. 5.
Figs. 7, 8, 9 are details of a unison switch mechanism controlling the operation of an electrically operated master switch.
Fig. 10 is a detail of a lamp signal device provided at each station.

The permanent main line tracer circuits from a transmitter to a distant receiver comprise (for the right line) movable contact 36, wires 37, 38, 39 (Fig. 1), wires 39[a], 38[a], 37[a], and movable contact 36[a] (Fig. 2), and (for the left line) movable contact 40, wires 41, 42 (Fig. 1), wires 42[a], 41[a], and movable contact 40[a] (Fig. 2). These circuits, as thus made up, are used for transmitting to or receiving from a distant station, according to the positions, controlled by master switch 5, of their movable contacts 36, 40, relatively to a pair of stationary contacts 43, 44, and a second pair of stationary contacts 45, 46. When the contacts 36[a], 40[a], engage the contacts 45[a], 46[a], as in Fig. 2, which illustrates a station in its normal position, the two main line circuits referred to are used for receiving from the distant station (Fig. 1). When, however, the contacts 36, 40 engage the contacts 43, 44, as in Fig. 1, these main line circuits are used for transmitting to the distant station, and also as part of the local right and left tracer lines leading from the transmitter to its own receiver. This will all be clear from the description, which will now be given, of the complete right and left line circuits from generator 3, of Fig. 1, through the receiver of Fig. 2, assuming the station of Fig. 1 to be in transmitting condition and the station of Fig. 2 to be in receiving or normal position, as they are shown. Of course, this description will be as applicable to the two stations, Figs. 1 and 2, if their conditions, just assumed, be reversed.

It may be noted here that, when contacts 36, 40, are moved into and out of engagement with stationary contacts 43, 44, the contact 8, heretofore referred to, is also moved by the master switch 5 into and out of engagement with the stationary contact 7, heretofore referred to; these two contacts 7, 8, forming part of the local circuit heretofore described from generator 3 and including rheostats 1, 2. With these three contacts 8, 36, 40, in engagement, respectively, as in Fig. 1, with stationary contacts 7, 43, 44, this local current-supplying circuit from generator 3 is closed by the engagement of contacts 7, 8. At the same time the following circuits are closed over the right and left main lines from Fig. 1 to the distant station (Fig. 2), by the engagement, at the station (Fig. 1), of contacts 36, 40, with contacts 43, 44, respectively: for the right line, roller contact 19, arm 21, wire 47, one secondary winding 48 of an induction coil 49, wire 50, contacts 43, 36, wires 37, 38, 39, (Fig. 1), wires 39[a], 38[a], 37[a], contacts 36[a], 45[a], wire 51[a], right hand relay 52[a], wire 53ª, right hand coil 54ª, movable rectilinearly in a magnetic field hereinafter described and which is excited by generator 3ª, and wires 55ª, 56ª, and 16ª, to ground at 4ª (Fig. 2); and, for the left line, roller contact 20, arm 22, wire 57, the other secondary winding 58 of induction coil 49, wire 59, contacts 44, 40, wires 41, 42 (Fig. 1), wires 42ª, 41ª, contacts 40ª, 46ª, wire 60ª, left hand relay 61ª, wire 62ª, left hand coil 63ª, movable rectilinearly in the magnetic field just referred to, and wires 64ª, 65ª, and 16ª, to ground at 4ª (Fig. 2). With these circuits thus closed, the two right and left line tracer circuits, from the transmitter of Fig. 1 through the local receiver of that station, are also closed, so that any message transmitted to the distant receiver (Fig. 2) will also be recorded in facsimile at the local receiver. These local tracer circuits are the same as those just described for the right and left line tracer circuits to the distant receiver, up to and including part of the wires 37, 41, respectively. Thence the right local circuit is traced by wire 66, containing a resistance 67, which is approximately equal to that met with on the corresponding or right main line to the distant receiver, wire 51, right relay 52, wire 53, coil 54, and wires 55, 56, and 16 to ground at 4; while for the left line the circuit is traced by wire 68, containing a resistance 69, contact 46, wire 60, left relay 61, wire 62, coil 63, and wires 64, 65, and 16 to negative pole of generator 3.

As the transmitting tracer 23 of Fig. 1 is moved laterally in writing, the roller contacts 19, 20 will be moved along the rheostats 1, 2, and as they are thus moved currents varying in strength, in accordance with the direction and extent of their movements, will be shunted into the right and left main line circuits to the distant receiver, and also into the similar circuits to the local receiver, with the result that the coils 54ª, 63ª, of the former, and the coils 54, 63, of the latter, will be moved rectilinearly, more or less, in accordance with the strength of such currents, and, in turn, through connections which will presently be described, effect lateral movements of the receiving pens 33ª, 33, respectively, corresponding in direction and extent to those of the transmitting tracer 23. Further description of this operation is deemed unnecessary, as it is generally the same as that of the system shown and described in my aforesaid Patent No. 954,150, although in some important respects, which will be pointed out, the devices in the receiver for effecting these movements of the receiving pen in the present case, and particularly the coils 54, 63, and their adjuncts, are materially different from those of my said patent.

In my said prior Patent No. 954,150, as well as in all other telautographs of that general type, of which I have knowledge, the coils which, like the coils 54, 63 of the present case, control the lateral movements of the receiving pen, have been mounted so as to move vertically. While systems, with coils so mounted, have, in the main, operated satisfactorily, yet there have been present in them certain objections which I have discovered may be overcome by mounting them, as in the present case, so as to move horizontally in the manner now to be described.

Figure 13:
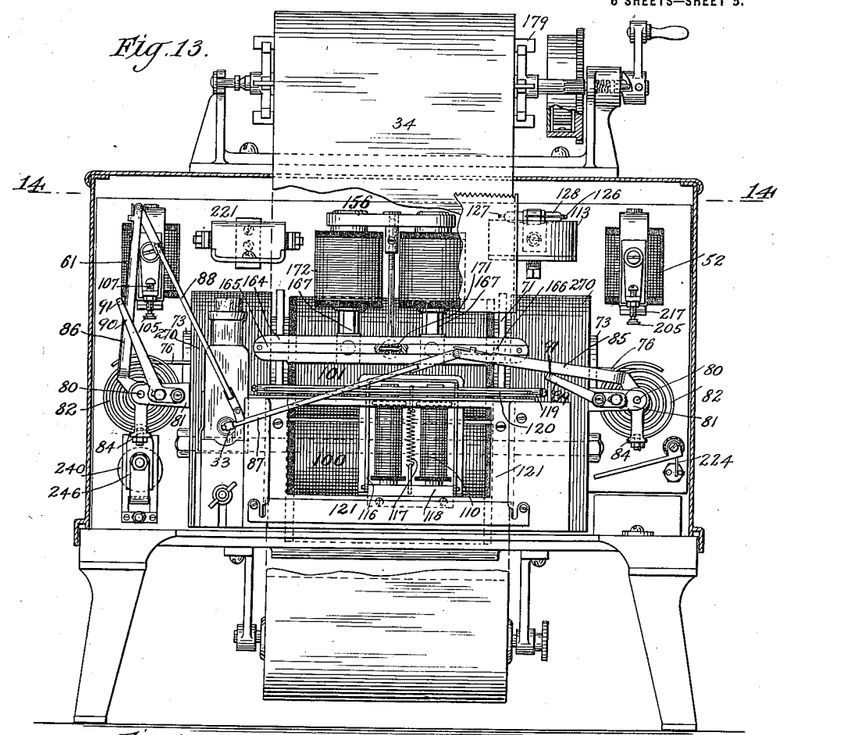
Fig. 13 is a front elevation of the receiving instrument with the casing thereof partly in section.
Figure 14:
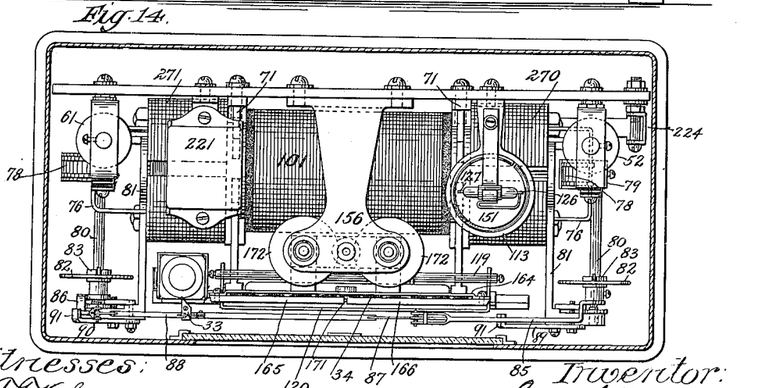
Fig. 14 is a horizontal section of the same on the line 14 of Fig. 13.
Figures 15, 16, 17, 18, 19, 20, 21, 22, 23:
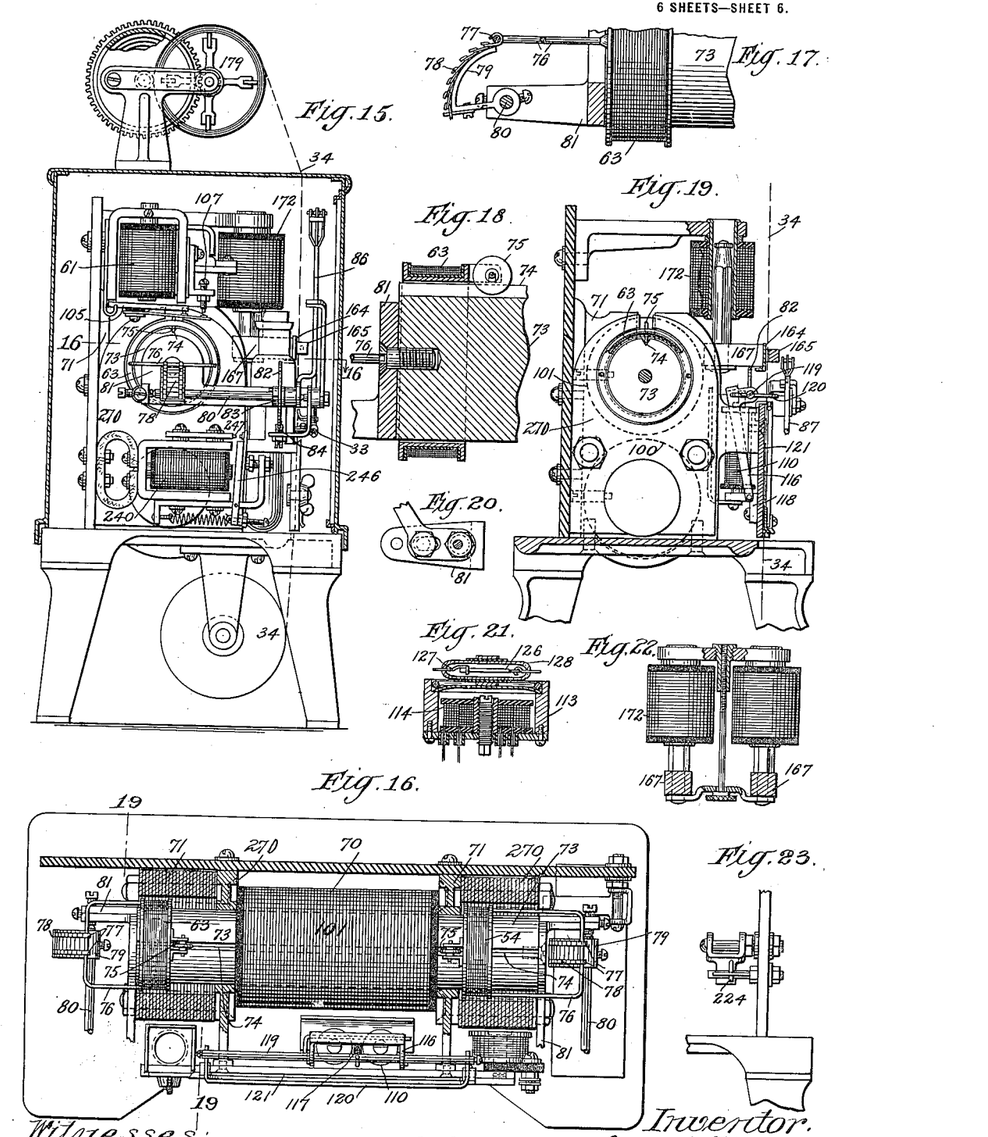
Fig. 15 is a vertical side elevation of the receiving instrument with the casing thereof in section.
Fig. 16 is a horizontal section on the line 16 of Fig. 15.
Fig. 17 is a detail, partly in section, of one of the pen moving coils of the receiving instrument and some of the connections between it and the receiving pen.
Fig. 18 is a detail in section showing the connection between one of the pen moving coils of the receiving instrument and the field magnet core on which it is mounted.
Fig. 19 is a vertical section on the line 19 of Fig. 16.
Fig. 20 is a detail of one of the devices for supporting and centering the receiving pen in its unison position.
Fig. 21 is a detail, in section, of a relay and a pair of relatively loose contacts controlled thereby, which latter, in turn, control the pen moving mechanism of the receiving instrument.
Fig. 22 is a detail, partly in section, of the magnet of the paper shifting mechanism at the receiving instrument.
Fig. 23 is a detail means for automatically making and breaking a signal circuit from one station to another.

The coils 54, 63, which, with their connections, are shown in detail in Figs. 14, 15, 16, 17, move in a horizontal direction, in a magnetic field provided by a magnet 70, supported in horizontal brackets 71 secured to a slab of slate mounted on the base of the receiving instrument. The coils 54, 63 are inclosed by the magnet pole pieces 270, and are slidably mounted on the magnet core 73. Preferably, the core 73 is provided with a longitudinal groove 74, and the coils 54, 63 with rollers 75 entering this frame, for the purpose of guiding and reducing frictional resistance to movement of the coils. Each of the coils 54, 63, is provided with a yoke 76 adapted to engage hooks 77 on a chain 78 resting upon and connected at its lower end with a segment 79 fixed to a shaft 80 journaled in ears projecting from a bracket 81 secured to a magnet core 73. The hooks 77 of chain 78 are of such width as to provide a broad bearing engagement with yoke 76 so as to prevent lateral rocking of the latter. Coiled springs 82 (one for each coil 54, 63) tend to move shafts 80 in a counter-clockwise direction and to normally, through segments 79, hold the coils in their normal positions; each spring being connected at its inner end with a collar 83 fixed to its shaft 80 and near its opposite end, with a clamping device 84 fixed to one of the ears of bracket 81, in which the shaft 80 is journaled, spring 82 being adjustable lengthwise relatively to this clamping device so that its tension may be increased or decreased as desired. Fixed to shafts 80 are two arms 85, 86, in the outer ends of which are pivotally mounted pen arms 87, 88, pivotally connected at their outer ends and carrying the receiving pen 33. At their forward ends, brackets 81 are provided with adjustably mounted arms 89, 90, having stops 91 for engaging the pen arms 87, 88, and accurately positioning them and receiving pen 33 in unison with the point of the latter in line with the opening in the usual ink bottle shown in Fig. 13.

In the receiving condition of a station the magnetic field in which its coils 54, 63 or 54ª, 63ª move, while a distant station is transmitting messages to it, is excited by the generator 3 or 3ª of the station so receiving, while the magnetic field for the coils of the receiver of the station transmitting is excited by the generator of that station, which generator is also supplying current to the right and left lines leading from it to the distant receiver and from its transmitter to its own receiver.

The circuits from the generators for so exciting these magnetic fields will now be described.

As the station (Fig. 1) has been heretofore dealt with as transmitting to the station Fig. 2, the local circuits from generator $3^a$ of the latter for exciting the magnetic field of coils $54^a$, $63^a$ will first be referred to. In this condition of the two stations it will be remembered that contacts 8, 36, 40 of Fig. 1 engage contacts 7, 43, 44 of that figure, while contacts $8^a$, $36^a$, $40^a$ of Fig. 2 are disengaged from contacts $7^a$, $43^a$, $44^a$, contacts $36^a$, $40^a$ being then in engagement with contacts $45^a$, $46^a$. The local circuit in such case for exciting the magnetic field of coils $54^a$, $63^a$ in Fig. 2 consists of wire $6^a$ from positive pole of generator $3^a$, contact $7^a$, wires $92^a$, $93^a$, lock magnet $94^a$ of a unison switch group hereinafter described, wires $95^a$, $96^a$, $97^a$, $98^a$, $99^a$, windings $100^a$, $101^a$ of field magnet $70^a$, wires $102^a$, $103^a$, $104^a$, spring contact $105^a$, mounted on but insulated from armature $106^a$ of left hand relay $61^a$, contact $107^a$, and wires $108^a$, $65^a$, $16^a$, to the negative pole of generator $3^a$. This circuit is opened and closed at a given station, as Fig. 2, at the contacts $105^a$, $107^a$, and is only closed when another station, as Fig. 1, is transmitting and current is therefore on the left main line, comprising wires 42, $42^a$, from the generator 3 of such other station, relay $61^a$ being then energized and attracting its armature $106^a$ which moves contact $105^a$ into engagement with contact $107^a$. A like circuit is also closed at the same time from generator 3 of the transmitting station through magnet 70 of the receiver of that station.

In view of the descriptions of operations which have been given from time to time up to this point, the operation of the system as thus far described need only be briefly stated. Still assuming Fig. 1 to be transmitting to Fig. 2, relays $52^a$, $61^a$ of Fig. 2 and 52, 61 of Fig. 1 will be energized by the current from generator 3, and the armatures $106^a$, 106 of relays $61^a$, 61 will thus move contacts $105^a$, 105 into engagement with contacts $107^a$, 107 of the respective receivers and thus close the local circuits, just described, in the two receivers, including the field magnet $70^a$, 70. As the tracer 23 is moved laterally over the writing platen 109, roller contacts 19, 20 will be correspondingly moved along rheostats 1, 2. Currents of varying strength, according to the positions from time to time, of contacts 19, 20, will be shunted into the main line tracer circuits to Fig. 2 and the local tracer circuits to the receiver of Fig. 1. Such currents, acting in opposition to springs 82, will cause the coils $54^a$, $63^a$ of Fig. 2, and 54, 63 of Fig. 1, to move to the right (Figs. 1 and 2) varying distances, according to the strength, from time to time, of the currents traversing said main and local tracer lines. The coils so moved will, through the connections before described, move the receiving pens $33^a$, 33, respectively, laterally, to the same extent and the same direction as transmitting tracer 23 is moved, thus producing in the two receivers the same writing produced in the transmitting station by tracer 23. When the transmitting operation is ended, the station (Fig. 1) which has been transmitting is restored to normal or receiving position by disengagement of its contacts 8, 36, 40 from contacts 7, 43, 44, respectively, transmitting tracer 23 being restored to its unison position Fig. 2. There being no current on the main tracer lines or the local tracer lines, coils $54^a$, $63^a$, and 54, 63 are then moved to the left, to normal position, and receiving pens $33^a$, 33, then restored to normal or unison positions, by the springs 82, each receiving pen in its normal position being in line with the opening in the ink bottle of its receiver.

The system as thus far described provides merely for the lateral movements of the receiving pen. Provision is also made, of course, for its movement to and from the writing surface and in and out of the ink bottle opening. The means provided for this purpose comprises a pen-lifting magnet 110 (best shown in Fig. 19), included in a local circuit in the receiver which is a branch of the field magnet circuit heretofore described. The description which will now be given of this local circuit is as applicable to Fig. 1 as to Fig. 2 in connection with which it will be specifically described for convenience, as that is receiving and Fig. 1 is transmitting. It is traced as follows: wire $6^a$ from positive pole of generator $3^a$, contact $7^a$, wires $92^a$, $93^a$, magnet $94^a$, wires $95^a$, $96^a$, $97^a$, $98^a$, $99^a$, field magnet $70^a$, wire $111^a$, pen-lifting magnet $110^a$, wire $112^a$, loose contact group $113^a$, controlled by a pen-lifter relay $114^a$, as hereinafter described, wires $115^a$, $104^a$, contacts $105^a$, $107^a$, and wires $108^a$, and $16^a$, to the negative pole of generator $3^a$, this circuit being closed at contacts $105^a$, $107^a$, when current in the left tracer line and relay $61^a$ theretofore energized, the armature $106^a$ of the relay then effecting engagement of these contacts, as in the case of the field magnet circuit. In other words, continuing the description with special reference to Fig. 2, when current is on the main line the local receiver circuits for the field magnet and the pen-lifting magnet are both closed by the left hand relay $61^a$, and during the closed condition of the pen-lifting circuit the pen-lifting magnet 110ᵃ is, at times, energized, and, at times, in effect deënergized, depending on the condition, relatively to each other, of the loose contact group 113ᵃ hereinafter described. When deënergized its pivotally mounted armature 116ᵃ, Fig. 2 (and 116, Figs. 16 and 19), is swung rearwardly by a spring indicated at 117 in Figs. 16 and 19, connected at one end with the magnet frame 118 (see Figs. 16, 19) and at its other end with a rod 119ᵃ Fig. 2 carried by the armature and in turn carrying a pen rest 120ᵃ, so that said pen rest is withdrawn from engagement with the pen arms 87ᵃ, 88ᵃ. These pen arms then move inwardly toward the receiver platen (shown at 121 in the detail view Fig. 19) so that the receiving pen 33ᵃ carried by them will rest against the record strip 34 or in the bottle opening, depending on the lateral position of the receiving pen. When the magnet 110ᵃ is energized its armature 116ᵃ and pen rest 120ᵃ are swung outwardly with the result that the latter will move pen arms 87ᵃ, 88ᵃ away from receiving platen 121, and the receiving pen 33ᵃ out of contact with the record strip or out of the bottle opening, as the case may be. These inward and outward movements of the receiving pen 33ᵃ take place simultaneously with like movements of the transmitting tracer, which controls such movements of the receiving pen 33ᵃ through a platen switch 125 in the same manner now to be described.

The loose contact group 113ᵃ, forming part of the pen-lifting circuit just described, consists, as in my said Patent No. 954,150, of a pair of contacts 126, 127 (see Fig. 21) inclosed by a hermetically closed tube 128 and loosely engaging each other, so that one may have a slight amount of play relatively to the other. So long as their engagement is uninterrupted the local circuit for pen-lifting magnet 110ᵃ is undisturbed and said magnet remains sufficiently energized to attract its armature and hold pen arms 87ᵃ, 88ᵃ and receiving pen 33ᵃ in their outward position, that is, with the pen out of the writing plane or out of the bottle opening. Rapid vibration, however, of the one contact relatively to the other will produce such a condition of interruption in the circuit of the pen-lifter magnet 110ᵃ that the latter, during the continuance of such interruptions, is, in effect, deënergized so that it will release its armature 116ᵃ, with the result that receiving pen 33ᵃ will move into contact with the paper or into the bottle opening, as described in my said patent. The relative condition of the contacts 126, 127, is controlled by platen switch 125 at the transmitter as follows: The transmitter is provided with a short circuiting buzzer 129, which in the transmitting condition of a station, for example Fig. 1, is included in a branch of the local current-supplying circuit, at the transmitter, which, in the transmitting condition of the station, is closed at the contacts 7, 8, from positive pole of generator 3, as before pointed out, this circuit passing thence by wires 9, 10, 11 to rheostat 1, and by wires 12, 13, 14, 15 to rheostat 2. This branch circuit for buzzer 129 comprises wires 130 leading from wire 12, and whence the circuit takes two paths, one consisting of wires 131, 132, 133, primary winding 134 of induction coil 49, wires 135, 136, (the latter including a resistance 137) and wire 138 to the negative pole of generator 3, and the other consisting of wire 139, buzzer 129, wires 140, 141, 142, and wires 136, 138, to the negative pole of generator 3. This two part branch circuit is normally, and also while the transmitting tracer 23 is in a raised position, during a receiving operation, shunted out of circuit with the current-supplying circuit from generator 3, by a shunt circuit consisting of wire 143, from wire 12 of the current-supplying circuit, platen switch 125, contact 144, and wires 145, 142, 136, 138, to the negative pole of generator 3. When, however, platen switch 125 is depressed by pressure of the transmitting tracer or the hand of the operator on the writing platen 109, as in writing, this short circuit will be broken, and the two part branch circuit including buzzer 129 and induction coil primary winding 134 electrically connected with the current-supplying circuit. While so connected current will pass over the two parts of this branch circuit, the one including buzzer 129 and the other primary induction coil winding 134. That passing over the former will energize the buzzer magnet 129, whose armature 146 will then engage a contact 147 and form a shunt, by wires 130, 131, 148, contact 147, armature 146, and wires 141, 142, 136, 138, around magnet 129 and primary winding 134. Current passing through magnet 129 will then fall until it reaches a point where armature 146 is released and withdrawn from contact 147 by its spring, when the circuits through magnet 129 and primary winding 134 will be reëstablished. Armature 146 will then again be attracted and engaged with contact 147, thereby again short-circuiting magnet 129, and primary winding 134, and so on, so long as platen switch 125 is depressed out of engagement with contact 144. The vibration in this way of armature 146 causes pulsatory currents to traverse the primary winding 134 of the induction coil 49, which in turn induce corresponding vibrations in the secondary windings 48, 58, of the induction coil, as well as in the currents traversing the right and left tracer lines to the distant receiver and the right and left tracer lines to the local receiver, which right and left lines, it will be remembered, include these windings 48, 58, respectively. These vibrations on the main lines in turn produce, through pen-lifting relay 114$^a$ (the winding 149$^a$ of which is bridged by wire 150$^a$ including a condenser across the right and left line wires 51$^a$, 60$^a$) vibrations of a metal diaphragm 151$^a$ on which tube 128$^a$ is mounted, with the result that the contacts 126$^a$, 127$^a$ therein are vibrated relatively to each other so as to repeatedly interrupt and in effect open the circuit heretofore described through pen-lifting magnet 110$^a$, whose armature 116$^a$, and pen rest 120$^a$, carried thereby, will be withdrawn from pen-supporting position and the receiving pen 33$^a$ thereupon move inwardly toward the platen. Like movements of the receiving pen 33 in the local receiver are effected by the pen-lifting relay 114 therein, simultaneously with those of the receiving pen 33$^a$ on the distant receiver.

To summarize briefly the operations just described, so long as the transmitting tracer 23 is raised from the writing platen 109, platen switch 125 occupies the raised position in which it is shown in Fig. 1, in engagement with contact 144. Buzzer magnet 129 and primary winding 134 of induction coil 49 are thus short-circuited and no vibrations are induced in the main lines to the distant and local receivers. The loose contacts 126$^a$, 127$^a$ and 126, 127 in tubes 128$^a$ and 128 are therefore undisturbed and pen-lifter magnets 110$^a$, and 110 remain energized, with their armatures 116 and pen rests 120$^a$, 120 thrusting the receiving pens 33$^a$, 33 away from their writing platens, which is the position then of the transmitting tracer 23 relatively to its writing platen 109. While writing platen 109 is depressed by tracer 23 or the hand of the operator, platen switch 125 is disengaged from contact 144. Magnet 129 and primary coil 34 are then in circuit and there are produced in the manner just described vibrations in the right and left tracer lines which disturb the engagement of the relatively loose contacts 126$^a$, 127$^a$ and 126 and 127 in the tubes 128$^a$, 128 of the two receivers, interrupting, and in effect opening, the circuit through the pen lifter magnets 110$^a$, so that the pen rests 120$^a$, 120 of the two receivers will be withdrawn from pen-supporting position and the receiving pens 33$^a$, 33 thus moved into contact with the record strips in the respective receivers, a position which they will retain so long as the writing platen at the transmitting instrument is depressed. It may be noted here that a resistance 152 is shunted around the pen-lifter magnet 110 for the purpose of diminishing the spark at the relatively loose contacts 126, 127, affording a path for the discharge current of said magnet.

Each transmitter is provided with a paper shifter, as a whole designated 155 in Fig. 1 and 155$^a$ in Fig. 2, and each receiver is provided with a similar paper shifter designated 156 in Fig. 1 and 156$^a$ in Fig. 2. A description of the shifters at one station will be sufficient, those of Fig. 1 being selected for such description.

Before describing the paper shifter at the transmitter Fig. 1 (shown best in Figs. 3, 4, 5, 6), it should be noted that the paper strip 35 there is in the form of a roll the core 157 of which rests in journals provided in brackets 158 secured to the slab 29 and extending outwardly from the front end of the transmitter casing 31; these brackets also carrying a rod 159 which is pivotally mounted in the brackets, and on which the writing platen 109 is mounted by arms 160 secured to the front end of the platen. The paper strip 35 is led from the supply roll through a guideway 161 at the front end of the casing, thence over writing platen 109, which also has paper-guides 162, and finally out through a slit 163 at the rear end of the casing. Beyond the platen 109, is provided the paper-shifting mechanism, which comprises a reciprocating paper-clamping device consisting of a lower bar 164 over which the strip 35 passes, and a parallel pair of upper bars 165, 166 under which the strip passes. Bar 164 is fixed to the armature 167 of an electromagnet 168 suitably mounted from slab 29 at the rear of the transmitter, and the bars 165, 166, which are iron, are fixed to the bar 164 at their outer ends, being free at the inner ends to move to and from the bar 164 and when so moved serving to grip and release the paper strip 35. This clamping device is moved rearwardly by the energization of magnet 168 and the attraction and rearward movement of its armature 167, and when so moved it clamps the paper strip, between bar 164 and the bars 165, 166, and moves it rearward one step so as to bring a fresh portion of the strip into the field of writing over platen 109. It is moved in the opposite or forward direction, when magnet 168 is deënergized, by a spring 170 which then moves armature 167 in that direction. When magnet 168 is thus deënergized bars 165, 166 are released from the pull of the armature 167, and, therefore, move upwardly and away from the paper strip 35, which, during the forward or non-feeding movement of the clamping device, is therefore released from the grip of these bars. Restoration of bars 165, 166 to their upper position, in such case, is insured by the provision of a light spring connection between their adjacent ends.

The construction and method of operation of the paper-shifting devices in the local receiver and in the distant transmitter and receiver are the same as that just described, except that, the receiver in each case being vertical, the paper-shifting mechanism is arranged to feed the paper strip vertically instead of horizontally. For convenience, however, in following the circuits, the paper shifter magnet of the local receiver (Fig. 1) is designated 172; the two corresponding paper shifting magnets of the transmitter and receiver of the distant station (Fig. 2) being designated 168ª, 172ª, respectively.

In the case of the paper-shifter magnet 168 of the transmitter of the station transmitting, Fig. 1, energization thereof is effected from generator 3 by a circuit which is traced as follows: wire 6, from the positive pole of generator 3, contacts 7, 8, wires 9, 172, paper-shifter magnet 168, wires 173, 174, to the negative pole of generator 3.

The circuit for the paper-shifter magnet 172ª of the receiver (selecting Fig. 2 as that is receiving from Fig. 1), is a branch of the local circuit, heretofore described, for exciting the magnetic field of the receiver, and is traced, from wire 96ª of that circuit, leading from the positive pole of generator 3ª, by wire 175ª to magnet 172ª, thence by wire 176ª to the polarizing winding of the pen-lifter relay 114ª, and thence by wires 177ª, 115ª, 104ª, contacts 105ª, 107ª, and wires 108ª, 65ª, and 16ª, to the negative pole of generator 3ª. The circuit for the paper-shifter magnet 172 of the receiver of the station transmitting, Fig. 1, is traced in the same way from generator 3.

It will be understood, of course, that the paper-shifter magnets 168 of the transmitter (Fig. 1) 172 of the local receiver, and 172ª of the distant receiver, Fig. 2, are all energized, and the paper strips 35 of the transmitter and 34 of both receivers are fed forward one step, on the closing of the tracer line circuits from said transmitter to the distant and local circuits by the movement of the contacts 8, 36, 40 into engagement with stationary contacts 7, 43, 44, respectively, and it will also be understood that in order to move these record strips forward a number of steps immediately following each other, all that the operator need do is to move contacts 8, 36, 40, into and out of engagement with contacts 7, 43, 44, a number of times equal to the number of steps he wishes to move the strips. It may also be noted here that as the paper strip 35 or 34 leaves the transmitter or receiver casing it may be torn off or wound up on a spring-operated take-up reel 179.

Figure 11:
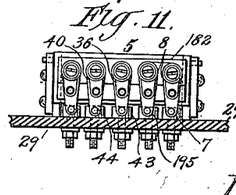
Figure 12:
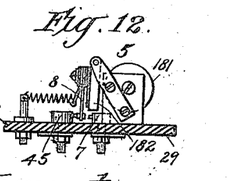

The master switch 5 heretofore referred to, and which controls movable contacts 8, 36, 40, will now be described, and in connection with it certain parts of the unison switch group, designated 180 as a whole, which control its operation. This master switch (shown in detail in Figs. 11, 12) comprises an electro-magnet 181, hereinafter referred to, the armature 182 of which carries the three contacts 8, 36, 40, heretofore referred to. Normally this magnet is de-energized and its armature 182 therefore occupying the position in which it is shown in Fig. 2, that is to say, with contact 8 out of engagement with stationary contact 7 and contacts 36, 40 out of engagement with contacts 43, 44, and in engagement with contacts 45, 46, as in said Fig. 2. This, as before stated, is the normal condition of each station and in such condition the station is ready to receive but not to transmit, the transmitter being out of circuit with generator 3 as well as with the right and left lines to the distant station and to its own receiver, as indicated in that part of the description which has already been given of the circuits as they exist when one station is transmitting to the other.

Figure 9:
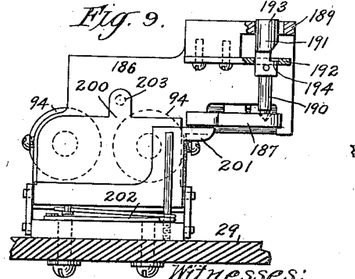

Master switch magnet 181 of Fig. 1 is included in a local circuit consisting of wire 6, from positive brush of generator 3, contact 7, wires 92, 182, a pair of movable contacts 183, 184, wire 185, magnet 181, and wires 186, 174, 138 to the negative brush of generator 3. Normally this circuit is open, at the contacts 183, 184, as shown in Fig. 2, where the station is shown as in normal or receiving position. When, however, a station is transmitting this circuit is closed, as shown in Fig. 1, so that magnet 181 will attract its armature 182 and through it, move contacts 8, 36, 40, into and hold them in engagement with contacts 7, 43, 44. The making and breaking of this circuit at each station is controlled by the operator at that station, through the following devices (shown in detail in Figs. 7, 8, 9): Contact spring 183 just referred to is secured to, but insulated from, a bracket 186 mounted on slab 29. A bell crank lever 187 pivotally mounted in ears 188 in an upper lateral extension 189 of said bracket with its vertical arms engaging contact spring 183 and its horizontal arm engaged by a push pin 190 resting in a notch therein and provided with a stem 191 projecting upwardly through a slot in a latch plate 192 and also with a button 193 projecting upwardly through a similar slot in lateral extension 189 of bracket 186 alongside of and in substantially the same horizontal plane with the writing platen 109 of the transmitter. The tendency of spring plate 183 is to hold contact 183 away from and out of engagement with contact 184, which is also secured to and suitably insulated from bracket 186. To cause such engagement, however, all that is necessary to be done is for the operator in charge of the station to depress stem 190, by engagement for example of the transmitting tracer 23 with button 193, and thereby rock bell crank lever 187, and through it move spring plate 183 inwardly so that contact 183 carried thereby will engage contact 184. This closes the circuit just described through switch magnet 181 and effects the engagement of contacts 8, 36, 40 with stationary contacts 7, 43, 44, as in Fig. 1; or in other words, changes the station from normal or receiving condition to transmitting condition, in which condition it continues until the engagement of contacts 183, 184 is broken, when the station returns to receiving or normal condition. Provision is made for locking these contacts 183, 184 in engagement, consisting of a shoulder or catch 194 which is engaged with the latch plate 192, so as to hold stem 191 depressed, by a slight sidewise movement of said stem after it has been depressed. Sidewise movement of the stem in the other direction will release it, when the contact 183, bell crank 187, and stem 190 will be returned to normal position by spring contact plate 180. The closing of this circuit through switch magnet 181, by engagement of the contacts 183, 184, short circuits the magnet 94, because contact plate 8 then bridges contact 7 and a contact 195, which are connected to the outside leads 93, 95 of said magnet, as follows, contact 7 by wire 92 to wire 93 and contact 195 by wire 196 to wire 95.

The closing of the local switch magnet circuit just described by the depression of key stem 190 and engagement of contacts 183, 184, and consequent closing of the main tracer lines to the distant station, as Fig. 2, results in energization of the lock magnet 94$^a$ at the distant station because it is included in, for example, the local circuit at that station for exciting the magnetic field thereof, which circuit it will be remembered is closed by the attraction of armature 106$^a$ by left relay 61$^a$ and consequent engagement of contacts 105$^a$, 107$^a$. Magnet 94 (see Fig. 7), thus energized, will attract its armature 200 which has pivotally connected to it a locking bar 201 that then passes under the horizontal arm of bell crank 187 to prevent downward movement thereof. Operation of the unison switch 180$^a$ at the distant station is therefore prevented so long as the other station is transmitting, the transmitter parts at the former being locked in unison position. Armature 200, and its pivoted locking bar 201, are held normally in retracted position by a spring 202.

It might sometimes happen that the unison switches 180, 180$^a$ of both stations would be operated practically simultaneously and this would result in confusion and delay in determining which station should have precedence in transmitting to the other. It will be found, however, in such cases, that while the dual operation is apparently simultaneous, one really precedes the other slightly, and the station at which this occurs is of course the one entitled to first transmit. This situation is taken care of in the present case by the provision (Figs. 7, 8, 9) of the pivoted connection between the locking bar 201 and armature 200 of magnet 94, and the provision further of a rod 203 carried by a spring plate 204 attached at one end to bracket 186, this rod being in line with armature 200. From this construction it results that if in the case assumed the unison switch operation at one station, Fig. 1, for example, is slightly quicker than that at the other, the operator at the former will obtain the line for transmitting to the latter because the magnet 94 at his station has been short-circuited and the local circuits at the distant station closed through magnet 94$^a$ by energization of relay 61$^a$, as before described, so that magnet 94$^a$ will be energized and attract its armature 200$^a$, which through rod 203 will disengage contact 183$^a$ from contact 184$^a$ and open the circuit of switch magnet 181$^a$, contacts 8$^a$, 36$^a$, 40$^a$ then returning to normal position with contacts 36$^a$, 40$^a$ in engagement with contacts 45$^a$, 46$^a$. This will occur even though meanwhile downward movement of the key stem 190 of the unison switch 180$^a$ at the distant station has been completed.

Means are also provided in the present case for calling or signaling from one station to the other. With this in view each station is provided with a signal buzzer 210, 210$^a$, which is operated by switch 211, 211$^a$, respectively, at the distant station, when no writing current is on line. Assuming the signal to be from the station Fig. 1 to the station Fig. 2, the circuit over which the call or signal is sent consists of wire 6 from positive pole of generator 3, wire 212, resistance 213, spring contact 214, stationary contact 215, wire 216, right main line wire 39 (Fig. 1), right main line wires 39$^a$, 38$^a$, 37$^a$, contacts 36$^a$, 45$^a$, wire 51$^a$, right relay 52$^a$, wire 53$^a$, coil 54$^a$, and wires 55$^a$, 56$^a$ and 16$^a$, to ground at 4$^a$. Relay 52$^a$ being thus energized at will, through its armature 205$^a$ and forward contact 217$^a$ close the following local circuit in the receiver Fig. 2: wire 6$^a$ from generator 3$^a$, contact 7$^a$, wires 92$^a$, 93$^a$, magnet 94$^a$, wires 95$^a$, 96$^a$, 97$^a$, 218$^a$, contact 219$^a$, of signal buzzer 210$^a$, armature 220$^a$, wire 221$^a$, magnet windings of buzzer 210$^a$, wire 222$^a$, contact 223$^a$, lever 224$^a$ (which, when magnet 70$^a$ is not excited, rests against contact 223$^a$), wire 225$^a$, armature 205$^a$, contact 217$^a$, and wires 226$^a$, 56$^a$ and 16$^a$ to the negative pole of generator 3$^a$. As just indicated, signals may be sent from one station to another so long as writing currents are not traversing the main lines. When such is the case lever 224$^a$ rests against contact 223$^a$ and this signal circuit may be closed at the switch 211 (Fig. 1). As soon as writing currents are on the main lines the field magnet 70ª is excited from generator 3ª and lever 224ª is attracted thereby, thus breaking the signal circuit.

Each station is also provided with a busy visual signal consisting of a lamp 230, 230ª (see Fig. 10), indicating to the operator that his local circuits are closed, when he is transmitting, this signal being operated by the following circuit: wire 6 from generator 3, contacts 7, 8, wires 9, 10, 12, 13, 231, lamp 230, wire 232 including resistance 233, and wires 18, 16 to the negative pole of generator 3.

Means are also provided in the present case for vibrating the movable parts of the distant receiver as well as the receiver of the station transmitting. These devices, which will now be briefly described, do not, however, constitute any part of the present invention, the same being the invention of Henry W. O'Neill. The device provided for this purpose consists of a short-circuiting buzzer 240 located in the receiver, the circuit for which is traced as follows: from wire 96, which it will be remembered leads from the positive pole of the generator 3; wires 96, 97, 98, 99, winding 100 of field magnet 70, wires 241, 242, magnet winding of buzzer 240, wires 243, 244, 103, 104, spring contact 105, stationary contact 107, and wires 108, 65, and 16, to the negative pole of generator 3. Of course, it will be understood that this circuit is closed only when writing currents traverse the tracer lines to the local receiver and to the distant receiver, such current traversing the left tracer line, including the wire 60 in the case of the local receiver, and the corresponding wire 60ª, in the case of the distant receiver, energizing relay 61 in the local receiver, 61ª in the distant receiver, thereby effecting engagement of the contacts 105, 107 in the former, and 105ª, 107ª in the latter, thus closing the buzzer circuit just described. A shunt consisting of wire 245, armature 246 of buzzer magnet 240, contact 247, and wire 248 is formed around the buzzer magnet 240, so that when the latter is energized so as to attract its armature 246, such armature, by engagement with the contact 247, will short-circuit the buzzer 240. The buzzer magnet 240 thus short-circuited will thereupon release its armature 246, thereby again establishing the circuit through the buzzer, which will again be broken by the ensuing contact of armature 246 with contact 247, and so on. As the winding 100 of magnet 70 is in multiple with buzzer 240, it follows that this winding will also be short-circuited by the armature 246 when it engages contact 247, and thus the magnetic field in which the movable coils 54, 63 are located will be maintained in a vibratory condition, and this vibration communicated by the coils 54, 63 to the parts connected therewith will maintain the whole pen-lifting group in a state of vibration, thereby greatly diminishing friction in these parts.

Reference has heretofore been made to the spring contact 105 of the left relay 61 as being carried by the armature 106 of that relay, the two, as shown, being insulated from each other, and the armature 106 being provided with a contact 250, which, in the de-energized condition of relay 61, will engage the contact 105, this occurring, of course, when no writing currents traverse the main lines. The object of this construction is to short-circuit the winding 101 of field magnet 70, connected by wires 102, 103, 104 with contact 105, so as to cause the magnetism of the field to die out slowly and thus avoid a discharge of high voltage and relieve the insulation of strain; also to diminish the effect of this discharge current upon the paper-shifting magnet, which, being in multiple with the windings 100, 101 of field magnet 70, tends to act as a path for the discharge currents of the field magnet. The effect upon the paper shifter of the full discharge current would be a slow release of the paper-shifter armature.

It will also be noted that a resistance 251 is shunted by wire 252 around the field magnet winding 100 and serves as a path for the discharge current of that magnet.

What I claim is:

1. In a telautographic system, the combination, with main line tracer circuits from the transmitter to the receiver, a transmitter tracer, a receiving pen, a magnetic circuit at the receiver comprising a pair of core pieces, end yokes in contact with one core piece, said end yokes having holes through which the other core piece extends loosely to form a gap at each end of the said core piece, and means for energizing said magnetic circuit, of coils surrounding the latter core piece, and each movable in the respective gap in the magnetic circuit in a direction parallel to the axis of the core piece which said coils surround, said coils being included in the main line circuits, and connections between said coils and the receiving pen for effecting lateral movement thereof in accordance with the lateral movements of the transmitting tracer, substantially as described.

2. In a telautographic system, the combination, with main line tracer circuits from the transmitter to the receiver, a transmitter tracer, a receiving pen, a magnetic circuit at the receiver comprising a pair of core pieces, end yokes in contact with one core piece, said end yokes having holes through which the other core piece extends loosely to form a gap at each end of the said core piece, and means for energizing said magnetic circuit, of coils surrounding the latter core piece, and each movable in the respective gap in the magnetic circuit in a direction parallel to the axis of the core piece which said coils surround, said coils being included in the main line circuits, a support for each coil, an antifriction connection between each coil and its support to permit movements of the coil, and connections between said coils and the receiving pen for effecting lateral movement thereof in accordance with the lateral movements of the transmitting tracer, substantially as described.

3. In a telautographic system, the combination of main line tracer circuits from the transmitter to the receiver, a transmitting tracer and a receiving pen, a suitable magnetic field in the receiver, suitably supported coils having a horizontal rectilinear movement therein, an anti-friction connection between each coil and its support consisting of a roller on the former and a groove in the latter for easing such movement of the coil, and connections between said coils and the receiving pen for effecting lateral movement thereof in accordance with the lateral movements of the transmitting tracer, substantially as described.

4. In a telautographic system, the combination of main line tracer circuits from the transmitter to the receiver, a transmitting tracer and a receiving pen, a suitable magnetic field in the receiver, suitably supported coils having a horizontal retilinear movement therein, and connections between said coils and the receiving pen for effecting lateral movement thereof in accordance with the lateral movements of the transmitting tracer, said connections for each coil including a pivotally mounted sector device and a broad-bearing connection between it and the coil preventing lateral rocking of the coil, substantially as described.

5. In a telautographic system, the combination of main line tracer circuits, from the transmitter to the receiver, a transmitting tracer and a receiving pen, a suitable magnetic field in the receiver, suitably supported coils having a horizontal rectilinear movement therein, and connections between said coils and the receiving pen for effecting lateral movement thereof in accordance with the lateral movements of the transmitting tracer, said connections for each coil including a pivotally mounted sector device provided with a chain having a broad-bearing link connection between it and the coil preventing lateral rocking of the coil, substantially as described.

6. In a telautographic system, the combination, with main line tracer circuits from the transmitter to the receiver, a transmitter tracer, a receiving pen, a magnetic circuit at the receiver comprising a pair of core pieces, end yokes in contact with one core piece, said end yokes having holes through which the other core piece extends loosely to form a gap at each end of the said core piece, and means for energizing said magnetic circuit, of coils surrounding the latter core piece, and each movable in the respective gap in the magnetic circuit in a direction parallel to the axis of the core piece which said coils surround, said coils being included in the main line circuits, and connections between said coils and the receiving pen for effecting lateral movement thereof in accordance with the lateral movements of the transmitting tracer, said connections for each coil including a pivotally mounted sector device and means adjustably connecting with the coil, substantially as described.

7. In a telautographic system, the combination, with main line tracer circuits from the transmitter to the receiver, a transmitter tracer, a receiving pen, a magnetic circuit at the receiver comprising a pair of core pieces, end yokes in contact with one core piece, said end yokes having holes through which the other core piece extends loosely to form a gap at each end of the said core piece, and means for energizing said magnetic circuit, of coils surrounding the latter core piece, and each movable in the respective gap in the magnetic circuit in a direction parallel to the axle of the core piece which said coils surround, said coils being included in the main line circuits, and connections between said coils and the receiving pen for effecting lateral movement thereof in accordance with the lateral movements of the transmitting tracer, said connections for each coil including a pivotally mounted sector device and a link adjustably connecting it with the coil, substantially as described.

8. In a telautographic system, the combination, with main line tracer circuits from the transmitter to the receiver, a transmitter tracer, a receiving pen, a magnetic circuit at the receiver comprising a pair of core pieces, end yokes in contact with one core piece, said end yokes having holes through which the other core piece extends loosely to form a gap at each end of the said core piece, and means for energizing said magnetic circuit, of coils surrounding the latter core piece, and each movable in the respective gap in the magnetic circuit in a direction parallel to the axis of the core piece which said coils surround, said coils being included in the main line circuits, and connections between said coils and the receiving pen for effecting lateral movement thereof in accordance with the lateral movements of the transmitting tracer, said connections for each coil including a pivotally mounted shaft connected with the coil and rotated thereby in one direction, and provided with an adjustably mounted coil spring for moving it in the opposite direction, substantially as described.

9. The combination with a telautographic instrument, of a rectilinearly movable paper-gripping device, and means controlled by the operator for operating it, substantially as described.

10. The combination with a telautographic instrument, of a rectilinearly movable paper-gripping device, an electro-magnet and circuit therefor for operating it, and means controlled by the operator for making and breaking said circuit, substantially as described.

11. The combination with a telautographic instrument, of a rectilinearly movable paper-gripping device, an electro-magnet and circuit therefor for operating it, and means controlled by the operator for making and breaking said circuit, said paper-shifting device including paper-gripping devices of magnetizable material connected with the armature of the magnet and gripping the paper when the latter is energized, substantially as described.

12. The combination with the transmitter and the receiver of a telautographic system, and circuit connections between the same, of a rectilinearly movable paper-shifter at the receiver, and magnetic devices and circuit connections therefor at the receiver and controlled from the transmitter for operating said paper shifter, substantially as described.

13. The combination with the transmitter and receiver of a telautographic system and main line tracer circuits between the two, of a rectilinearly movable paper shifter at the receiver, and magnetic devices and circuit connections therefor at the receiver controlled from the transmitter through one of the tracer circuits, substantially as described.

14. In a telautographic system the combination of main line tracer circuits from the transmitter to the receiver, a receiving pen, a suitable magnetic field in the receiver and pen-controlling members movable therein in accordance with the currents traversing the main lines, and a circuit making and breaking contact controlled by the magnetic field, substantially as described.

15. In a telautographic system the combination of main line tracer circuits from the transmitter to the receiver, a receiving pen, a suitable magnetic field in the receiver and pen-controlling members movable therein in accordance with the currents traversing the main lines, and a signal current controlled by the magnetic field, substantially as described.

16. In a telautographic system the combination of main line tracer circuits from the transmitter to the receiver, a receiving pen, a suitable magnetic field in the receiver and pen-controlling members movable therein in accordance with the currents traversing the main lines, a circuit making and breaking contact controlled by the magnetic field, and a signal circuit controlled by said contact, substantially as described.

17. In a telautographic system the combination of main line circuits from the transmitter to the receiver, a receiving pen, a suitable magnetic field in the receiver, a local circuit for exciting it, means controlled by one of the main lines for opening and closing this local circuit, a signal circuit, means controlled by the other main line for opening and closing it, and a circuit making and breaking contact for the signal circuit, controlled by the magnetic field and moved to breaking position when the magnetic field is excited, substantially as described.

18. In a telautographic system the combination of a transmitter and receiver at one station, a transmitter and receiver at another station, main line tracer circuits between the two stations, an electrically operated switch mechanism at each transmitter for electrically connecting it with the receiver of the other station through said tracer lines, and switch locking means at each station controlled from the other station whereby operation of such switch mechanism at the station which is receiving is prevented, substantially as described.

19. In a telautographic system the combination of a transmitter and receiver at one station, a transmitter and receiver at another station, main line tracer circuits between the two stations, an electrically operated switch mechanism at each transmitter for electrically connecting it with the receiver of the other station through said tracer lines, a local circuit for each such switch mechanism, a unison switch including manually operable circuit-closing means for said circuit and an electro-magnet provided with means for breaking said circuit, and a local circuit for the electro-magnet at each station controlled from the master switch of the other station, whereby on the movement of the master switch at one station to transmitting position said electromagnet at the other station prevents the closing of the local switch circuit thereat, substantially as described.

20. In a telautographic system the combination of a transmitter and receiver at one station, a transmitter and receiver at another station, main line tracer circuits between the two stations, an electrically operated switch mechanism at each transmitter for electrically connecting it with the receiver of the other station through said tracer lines, a local circuit for each such switch mechanism, a unison switch including manually operable circuit-closing means for said circuit, and an electro-magnet provided with means for breaking said circuit, and a local circuit for the electro-magnet at each station controlled from the master switch of the other station, said manually operated circuit-closing means being so arranged that when moved to closing position said magnet is out of circuit, whereby on the movement of the master switch at one station to transmitting position the electro-magnet at that station is out of circuit, and said electro-magnet at the other station prevents the closing of the local switch circuit thereat, substantially as described.

In testimony whereof, I have hereunto set my hand, in the presence of two subscribing witnesses.

GEORGE STEELE TIFFANY.

Witnesses:
J. A. GRAVES,
S. E. BROWN.